(12) United States Patent
Black et al.

(10) Patent No.: US 6,460,492 B1
(45) Date of Patent: Oct. 8, 2002

(54) COOLING SYSTEM FOR AN INTERNAL COMBUSTION ENGINE

(75) Inventors: Gregg T Black, Livonia, MI (US); Thomas A Jurecko, Lake Orion, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/865,832

(22) Filed: May 24, 2001

(51) Int. Cl.$^7$ ................................................. F01P 7/14
(52) U.S. Cl. ..................................... 123/41.1; 123/41.44
(58) Field of Search ............................. 123/41.1, 41.44

(56) References Cited

U.S. PATENT DOCUMENTS 4,875,437 A * 10/1989 Cook et al. ............... 123/41.1
5,967,101 A    10/1999 Roth et al.
6,182,616 B1 *  2/2001 Itoh et al. .................. 123/41.1

OTHER PUBLICATIONS 1999 4.7 I DaimlerChrysler Grand Cherokee—1999.

* cited by examiner

*Primary Examiner*—Willis R. Wolfe
*Assistant Examiner*—Rebecca A Smith
(74) *Attorney, Agent, or Firm*—Ralph E. Smith

(57) ABSTRACT

A new and improved cooling system for an internal combustion engine that includes a flow control assembly having a housing formed with a heater core inlet passage, a heater core bypass passage, an intake passage receiving coolant from the radiator, and an outlet passage connected to the coolant pump and in which the flow control assembly is characterized in that the pellet enclosed body portion of the thermostat cooperates with a tapered opening formed in the bypass passage for effectively controlling the flow of the liquid coolant through the bypass passage.

5 Claims, 3 Drawing Sheets

COOLING SYSTEM FOR AN INTERNAL COMBUSTION ENGINE

FIELD OF THE INVENTION

This invention concerns cooling systems for an automotive internal combustion engine and, more particularly, relates to an improved liquid coolant flow control assembly that incorporates a thermostat for controlling the flow of coolant between the internal combustion engine and the radiator and also controls the flow of coolant through the engine bypass passage.

BACKGROUND OF THE INVENTION

There are two standard design arrangements for the location of the thermostat in an internal combustion engine for sensing the temperature of the coolant and preventing the coolant from flowing through the radiator. One is referred to as an outlet side thermostat design and the other is an inlet side thermostat design. In the outlet side design, the thermostat is located in the engine outside of the coolant circuit and it serves to control the temperature of the engine cooling system based on the temperature of the coolant exiting the engine. One advantage of this type of arrangement is that it allows for higher pump inlet pressures to avoid cavitation and offers lower radiator pressures for the cooling system. However, one problem with the outlet side design is that the engine can incur fluctuating coolant temperatures, which could lead to higher engine out emissions.

The inlet side thermostat design is located in the coolant inlet side of the engine cooling system and controls the temperature of the coolant based upon the temperature of the coolant flowing through the engine bypass, heater core return, and the radiator outlet. This form of thermostat arrangement has been found to better control the warm-up temperature, tends to reduce any thermal shock, and improves the emissions and fuel economy of the engine.

SUMMARY OF THE INVENTION

The present invention is intended to be incorporated into the cooling system of an internal combustion engine having the inlet side thermostat design. However, as will be apparent from the detailed description which follows, the present invention could be utilized with an engine cooling system having the outlet side thermostat design and provide similar advantages experienced by an engine having the inlet side thermostat design. More specifically, the present invention provides a cooling system for an internal combustion engine having a liquid coolant circuit for connecting the engine with a heater core and a radiator. The engine is provided with a fluid pump for pumping the liquid coolant through the liquid coolant circuit. In addition, a coolant flow control assembly forms a part of the liquid coolant circuit and is incorporated within a housing forming a part of the engine. A thermostat is located within the housing of the flow control assembly for controlling liquid coolant flow between the internal combustion engine and the radiator through the liquid coolant circuit. The housing, containing the coolant flow control assembly, is formed with a heater core inlet passage, a heater core bypass passage, an intake passage receiving liquid coolant from the radiator, and an outlet passage connected to the fluid pump. The thermostat has a valve member adapted to close the radiator intake passage when the liquid coolant is below a predetermined temperature. A heat responsive expandable and contractible medium is enclosed within a cylindrical body portion of the thermostat and serves to cause the valve member to move to an open position when the temperature of the liquid coolant is above the aforementioned predetermined temperature to allow liquid coolant to flow from the internal combustion engine into and through the radiator. In addition, the housing has a tapered counterbore within the bypass passage for receiving and enclosing the lower section of the thermostat's cylindrical body within the tapered bore when the thermostat is in the open position so as to allow the heat responsive medium within such lower section to more effectively sense the temperature of the liquid coolant while controlling the flow of the liquid coolant through the bypass passage. The lower section and the tapered counterbore cooperate to provide a cleaning action within the bypass passage to prevent foreign debris from lodging within bypass passage.

Accordingly, one object of the present invention is to provide a new and improved cooling system for an internal combustion engine that incorporates a coolant flow control assembly having a thermostat which utilizes the enclosure of its heat responsive medium to control the size of the opening of the bypass passage.

Another object of the present invention is to provide a new and improved cooling system for an internal combustion engine that includes a flow control assembly having a housing formed with a heater core inlet passage, a heater core bypass passage, an intake passage receiving coolant from the radiator, and an outlet passage connected to the coolant pump and in which the flow control assembly is characterized in that the pellet enclosed body portion of the thermostat cooperates with a tapered opening formed in the bypass passage for effectively controlling the flow of the liquid coolant through the bypass passage.

A further object of the present invention is to provide a new and improved cooling system for an internal combustion engine that includes a flow control assembly having a housing formed with a heater core inlet passage a heater core bypass passage, an intake passage receiving coolant from the radiator, and an outlet passage connected to the coolant pump and in which the flow control assembly is characterized by having a thermostat which cooperates with a counterbore formed in the bypass passage for continuously allowing the flow of the liquid coolant through the bypass passage so as to prevent foreign debris such as core sand from lodging within the bypass passage when the thermostat is in the open position.

A still further object of the present invention is to provide a new and improved flow control assembly for the cooling system of an internal combustion engine in which the flow control assembly has a housing formed with a heater core inlet passage a heater core bypass passage, an intake passage receiving coolant from the radiator, an outlet passage connected to the coolant pump, and a thermostat having a valve member adapted to move between an open position and a closed position so as to control the flow of liquid coolant through the radiator and, at the same time, control the flow of the coolant through the bypass passage by causing a cylindrical section of the thermostat that contains a heat responsive medium to move into a tapered counterbore formed in the bypass passage when the valve member moves to its open position.

BRIEF DESCRIPTION OF THE DRAWINGS

The above and other objects and advantages of the present invention will become more apparent from the following detailed description and the drawings in which.

DETAILED DESCRIPTION OF THE INVENTION

Figure 1:
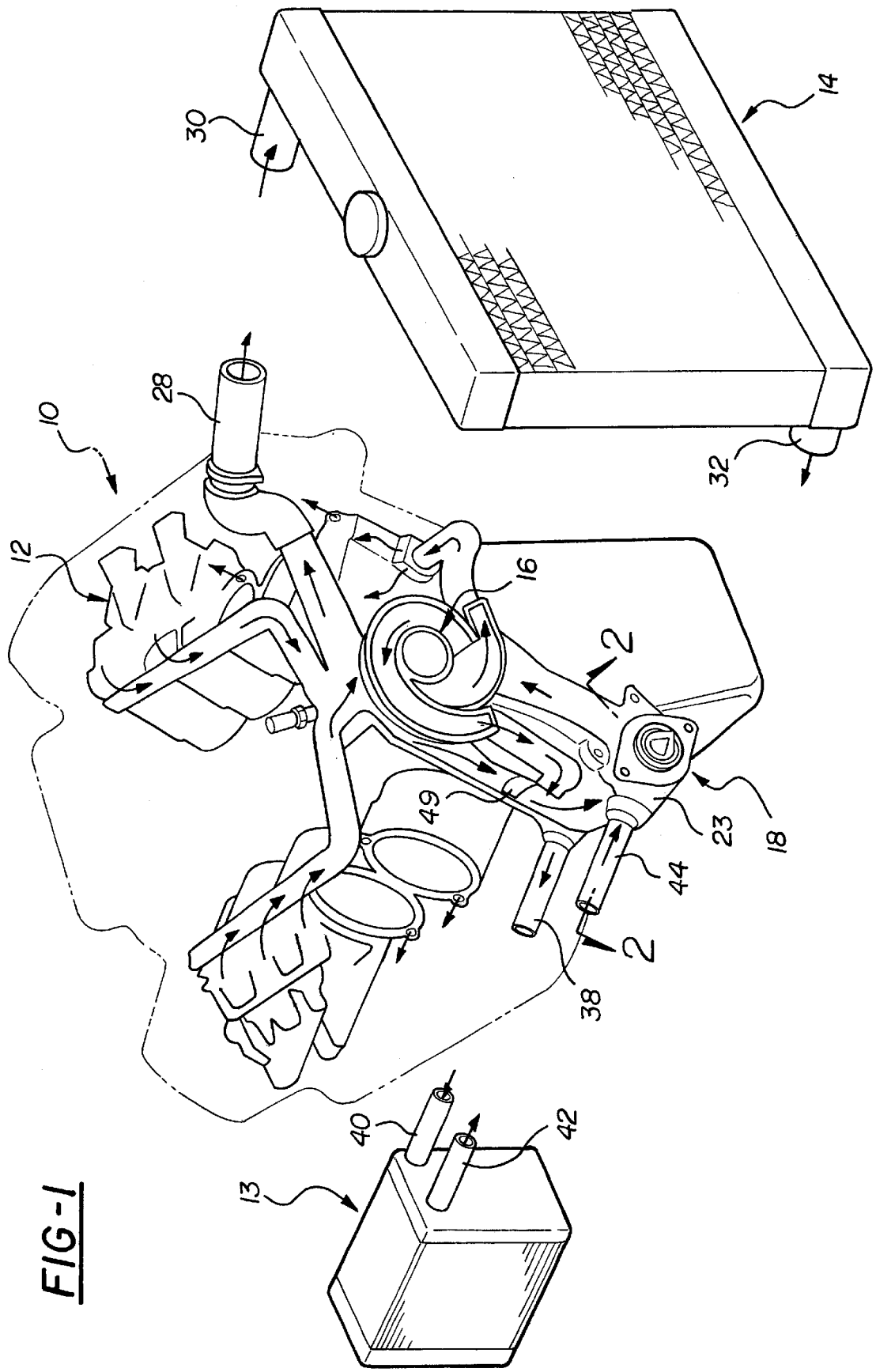
FIG. 1 is a perspective view of an internal combustion engine combined with a radiator and heater core with parts removed from the engine so as to expose the engine coolant system which serves to control the delivery of heated coolant to the heater core and the radiator in accordance with the present invention.

Referring to the drawings and more particularly to FIG. 1 thereof, a V-8 internal combustion engine of an automotive vehicle 10 is shown with parts broken away so as to expose the liquid coolant system of the engine. The liquid coolant system includes a heater core 13 and a radiator 14 the latter of which serves to cool the liquid coolant by having ambient air passing though the radiator 14. As is well known to those skilled in the art of automotive engine design, the cooling system regulates the operating temperature of the engine and it allows the engine to reach normal operating temperature as quickly as possible. The cooling system also maintains normal operating temperature and prevents overheating of the engine and provides a means of heating the passenger compartment of the vehicle by having the heated coolant pass through the beater corc.

Figure 2:
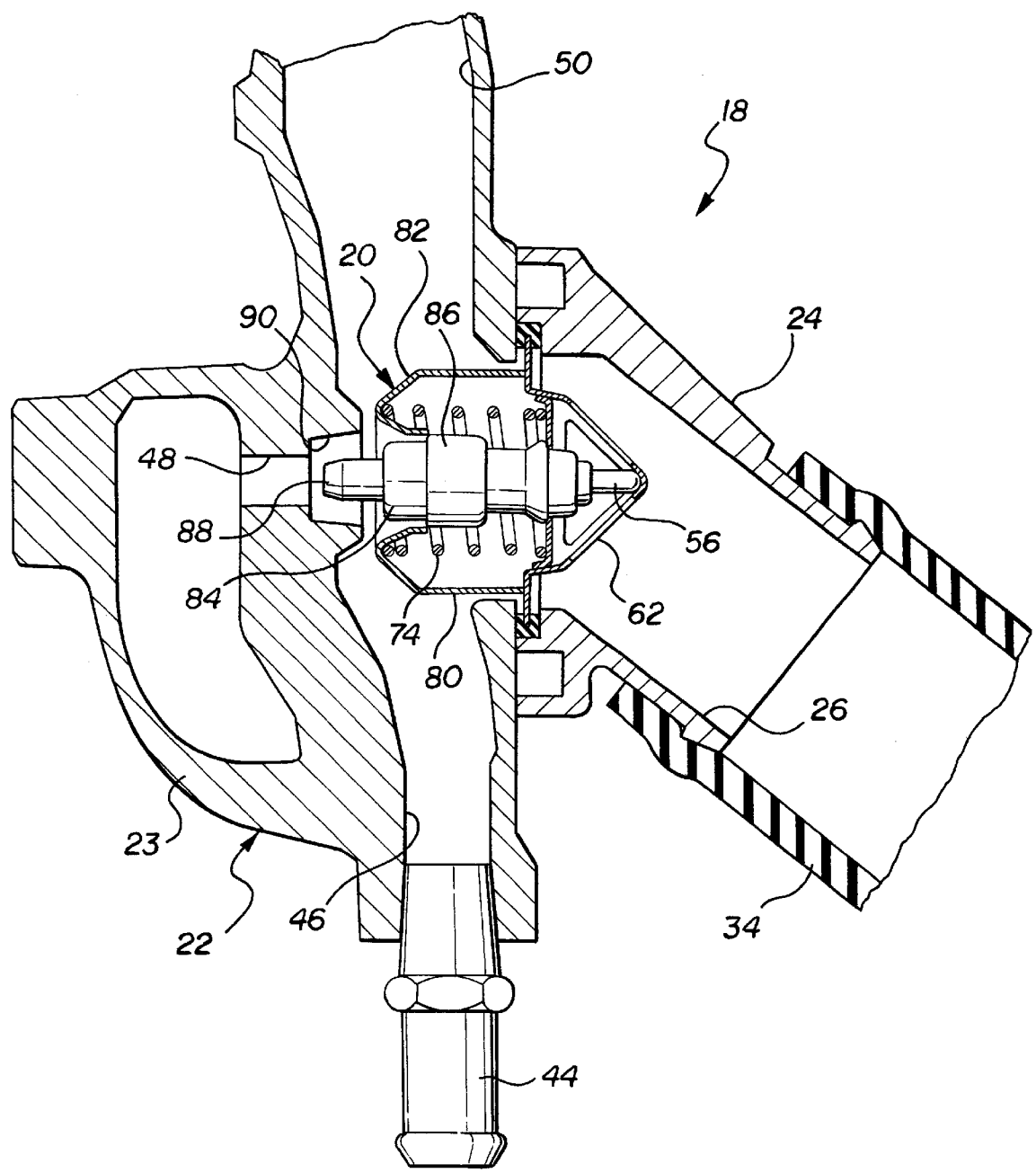
FIG. 2 is an enlarged sectional view taken on line 2—2 of FIG. 1 and shows the coolant flow control assembly for controlling the delivery of heated coolant to the heater core and the radiator.

As is conventional, the engine 10 is provided with a centrifugal fluid pump 16 which serves to pump the liquid coolant, as shown by the arrows, through a liquid coolant circuit that includes passages that extend throughout the engine block and through the right hand and left hand cylinder heads (each identified by reference numeral 12) and provides coolant to and from the heater core 13 and the radiator 14. The flow of the liquid coolant is controlled by a coolant flow control assembly 18 which includes a thermostat 20 mounted within a thermostat housing 22. As seen in FIG. 2, the thermostat housing 22 includes a front cover 23 and, as seen in FIG. 2, an adapter pipe 24 is fixedly bolted to the front cover 23 and provides a radiator outlet passage 26 for receiving coolant from the radiator 14. The thermostat 20 is operatively mounted within the thermostat housing 22 and serves to control the flow of the coolant out of the engine 10 through a coolant outlet pipe 28 and through a radiator inlet pipe 30 connected to the upper end of the radiator 14. The coolant outlet pipe 28 and the radiator inlet pipe 30 are fluidly interconnected by a rubber hose (not shown) and the coolant flowing through the radiator 14 exits therefrom through a radiator outlet pipe 32 which is fluidly connected by another hose 34 (see FIG. 2) to the radiator outlet passage 26 of the adapter pipe 24 of the flow control housing 22. In addition, during operation of the engine 10, the coolant in the engine 10 flows to the heater core 13 via an engine coolant outlet pipe 38 and an inlet pipe 40 connected to the heater core 13. The coolant returns from the heater core 13 to the engine 10 via a heater core outlet pipe 42 and enters the flow control assembly 18 via an engine inlet pipe 44 provided with a heater core inlet passage 46. Although not shown, it will be understood that the engine coolant outlet pipe 38 and the inlet pipe 40 of the heater core 13 are interconnected by a rubber hose and similarly, outlet pipe 42 of the heater core 13 and the inlet pipe 44 to the flow control assembly 18 are connected by a rubber hose. Also, as seen in FIGS.1 and 2, a bypass passage 48, which connects with a passage 49 in the front cover 23, is provided in the thermostat housing 22 for allowing the coolant to flow via the bypass passage 48 into the flow control assembly 18. As should be apparent, the pump 16 serves to draw coolant out of the flow control assembly 18 via an outlet passage 50 which fluidly connects to the pump 16.

Figure 3:
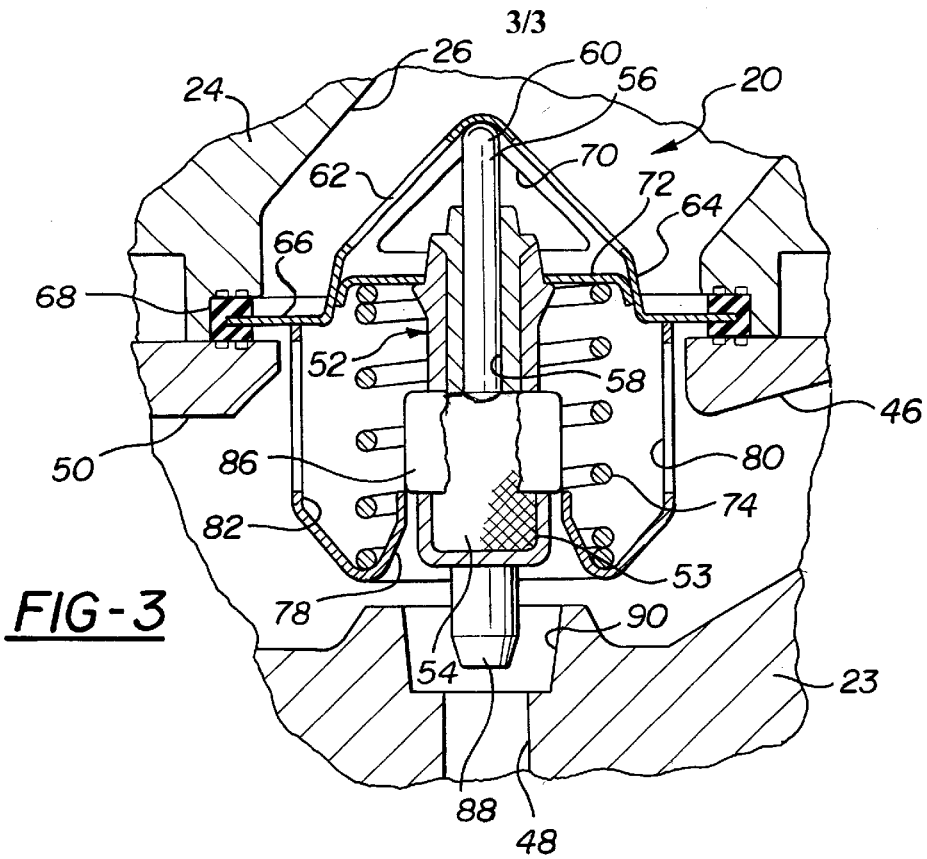
FIG. 3 is a further enlarged view of the thermostat and a portion of the housing forming a part of the coolant flow control assembly as seen in FIG. 2 and shows the thermostat in the closed position preventing heated coolant to flow through the radiator.
Figure 4:
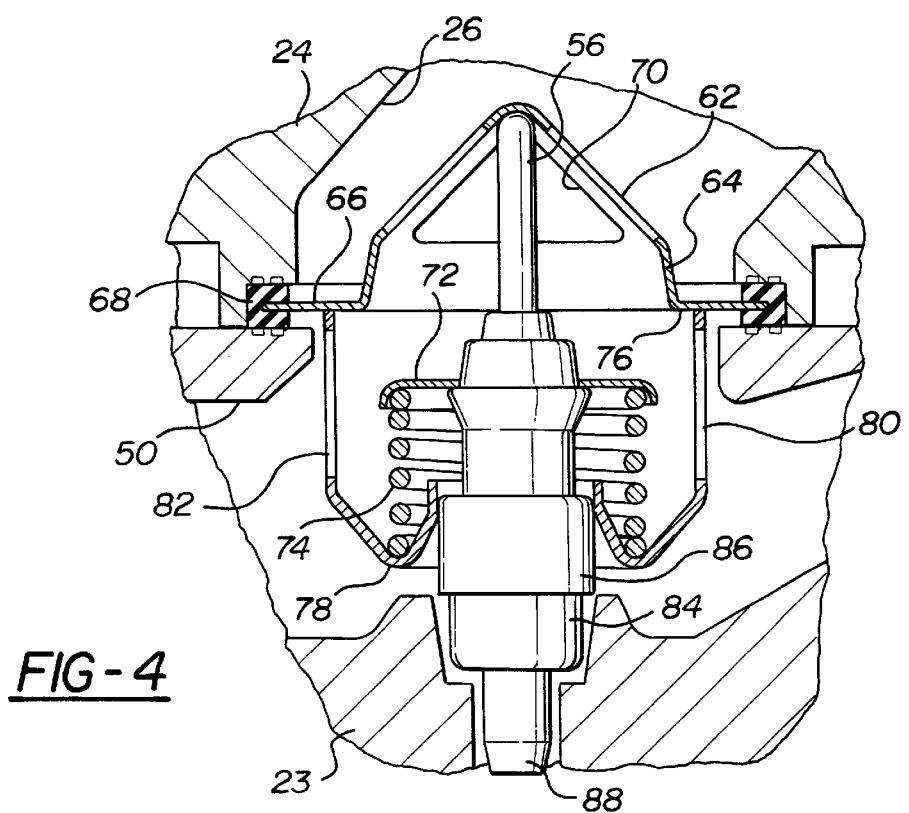
FIG. 4 is a view similar to that of FIG. 3 but shows the thermostat in the fully open position allowing coolant to flow through the radiator.

As best seen in FIGS. 2 and 3, the thermostat 20 located in the flow control housing 22 has an elongated inner cylindrical body 52 provided with a chamber 53 which houses a thermostatic medium, such as a pellet 54, that expands and contracts in accordance with changes in the temperature of the liquid coolant. A cylindrical rod 56 extends upwardly from the chamber 53 and is slidably mounted in a cylindrical opening 58 in the inner cylindrical body 52. The outer end 60 of the rod 56 engages the apex of a triangularly shaped cross member 62 that is integrally formed with an annular collar 64. The collar 64, in turn, is integrally formed with a ring-shaped member 66 the periphery of which is provided with an annular elastomeric seal 68 located between the front cover 23 and the adapter pipe 24 of the housing 22. The cross member 62 is formed with a triangular opening 70 in the upper end of the thermostat 20 as seen in FIGS. 3 and 4.

A disk-shaped valve member 72 is fixed to the upper end of the inner cylindrical body 52 and is normally urged by a helical spring 74 into sealing contact with an annular valve seat 76 provided by the interior wall of the collar 64. The spring 74 is operatively mounted around the inner cylindrical body 52 with its upper end, as seen in FIGS. 2–4, in contact with the underside of the valve member 72 while its lower end rests on an annular ring 78 rigidly attached to the ring-shaped member 66 by a pair of straps 80 and 82. As seen in FIG. 3, the thermostat 20 is in the closed position when the valve member 72 is in contact with the valve seat 76 to close communication between the passages 50 and 26. On the other hand, the thermostat 20 is considered to be in the open position when the valve member 72 in not in contact with the valve seat 76 as seen in FIG. 3. As is generally known, the thermostat 20 opens at a specific temperature or thermostat rating. Most thermostats begin to open at their rated temperature and are fully open about 20 degrees higher. The valve member 72 opens and closes as the coolant temperature changes. When the engine 10 is cold, the thermostat closes. As the engine 10 warms up, the thermostat 20 opens and allows coolant flow through the radiator 14.

As seen in FIGS. 2 and 3, the lower end of the inner cylindrical body 52 which contains the pellet 54 has a dual or stepped diameter consisting of a lower cylindrical section 84 and an upper cylindrical section 86. The lower section 84 is smaller in diameter than the upper section 86 and includes a lower depending cylindrical rod 88 which is centrally aligned with the lower section 84 and is located along the longitudinal center axis of the lower section 84. The lower section 84 and the rod 88 serve as a combined flow control member that is related in size to and cooperates with a tapered counter bore 90 and the bypass passage 48 of the housing 22 for controlling the flow of liquid coolant into the area where the spring 74 of the thermostat 20 is located. The rod 88 of the flow control member controls the flow of the coolant through the bypass passage 48 and through the tapered counterbore 90 and permits some coolant to circulate within the housing 22, engine block, and cylinder heads 12 when the engine 10 is cold and the thermostat 20 is in the closed position seen in FIG. 3. The lower section 84 of the flow control member constitutes a heat sensitive member which functions to essentially shut off coolant flow through the bypass passage 48 as will be explained hereinafter.

When the engine 10 is first started and when the temperature of the coolant is below the rated temperature of the thermostat 20, the valve member 72, and accordingly, the thermostat 20, will be in the closed position of FIGS. 2 and 3 causing the pump 16 to circulate the coolant through the engine 10 and the heater core 13. During this time, the bypass passage 48 is open (except for the restriction caused by the rod 88) permitting some of the coolant to flow through the bypass passage 48 into the passage 50 leading to the pump 16. At the same time, the coolant flows via the engine coolant outlet pipe 38 to the heater core 13 and is returned from the heater core 13 via the outlet pipe 42 and the heater core inlet passage 46 in the engine block inlet pipe 44 to the passage 50 from whence it is re-circulated by the pump 16 through the engine 10 and heater core 13.

When the coolant becomes heated by the heat energy of the engine 10, the pellet 54 expands causing the thermostat inner cylindrical body 52 to move downwardly to the position seen in FIG. 4. This action moves the valve member 72 off of the seat 76 to open the radiator outlet passage 36 so that the flow from the radiator 14 via pipe 32 and passage 26 passes through the thermostat 20 and enters the passage 50 of the housing 22 that connects with the pump 16. At the same time, the lower section 84 of the thermostat's inner cylindrical body 52 enters the tapered counterbore 90 formed in the bypass passage 48. Although the lower section 84 enters the tapered counterbore 90, the design of the flow control assembly 18 is such that the flow through the bypass passage 48 is not completely shut off. In other words, a slight cylindrical space or clearance remains between the lower section 84 and the sidewall of the tapered counterbore 90.

One advantage of the flow control assembly 18 described above is that the lower section 84 containing the pellet 54 is in direct contact with the coolant flowing through the bypass passage 48. As a result, the pellet 54, in effect, directly sees the coolant flow and permits the thermostat 20 to react accordingly. In other words, the pellet 54 is not shielded but is completely exposed to the by-pass flow of the engine 10 and allows increased coolant flow through the radiator 14 and the heater core 13. Another advantage of this arrangement is that if any engine core sand should be flowing through the passages of the coolant circuit, the clearance provided between the lower section 84 and the side wall of the tapered counterbore 90 will allow the sand to pass through. Thus, a cleaning action is provided in the bypass passage 48 and prevents the sand or any other minute foreign debris from wedging into the moving parts of the thermostat 20. Moreover, the taper of the counterbore 90 as well as the size of the lower section 84 of the body 52 is designed so as to modulate coolant flow shut off at a specific temperature of the coolant. The taper of the counterbore 90 also serves to guide the lower section 84 into the counterbore 90 to avoid a binding situation that could destroy the functioning of the thermostat 20.

The coolant flow assembly, as described above, has been successfully tested in a DaimlerChrysler internal combustion engine identified as Part No. 53021368BC (2002 3.7 liter automatic). The heater core 13 employed with this engine was part of a HVAC assembly made by Valeo Climate Control Systems and is identified as Part No. 5503745AC. The radiator 14 used with the engine was made by Modine Manufacturing Company is identified as Part No. 52080118AB. The thermostat 20 incorporated in the coolant flow assembly is identified as Part No. 52079476AB and was a part of an overall assembly identified as Part No. 53020888AC. This particular thermostat starts to open at 195 degrees Fahrenheit and is in the fully open position of FIG. 3 at 215 degrees Fahrenheit. In this particular engine configuration, the counter bore 90 at its outlet end measured 17.08 mm. Moreover, the counterbore 90 had a taper of 7.5 degrees and had a depth of 9.85 mm. The by-pass passage 48 had a diameter that measured 11 mm. In the fully open position of the thermostat 20 as seen in FIG. 4, the clearance between the lower section 84 and the sidewall of the counterbore 90 measured 1.5 mm. The travel distance of the lower section 84 from the fully closed position of the thermostat 20 (as seen in FIG. 3) to the fully open position of FIG. 4 measured 8.5 mm.

It will be noted that it is important to have the tightest counterbore taper in relation to the diameter of the lower section 84 of the thermostat 20. In the particular engine tested, it has been found that the 7.5 degree taper was the tightest that allowed for the machining, positional and thermostat tolerance as well as manufacturing feasibility, non-binding, and self-cleaning action. The tight relationship between the lower section 84 and the tapered counterbore 90 will effectively shut off the bypass flow of the coolant when the thermostat 20 is in the full open position of FIG. 4. As aforementioned, at the same time, the spacing of 1.5 mm between the lower section 84 and the counterbore 90 provides the self-cleaning feature to prevent any debris from lodging in the counterbore 90. It has also been found that the depth of the tapered counterbore 90 is important to effectively shut off the bypass flow and for durability concerns. In this regard, the depth of the tapered bore 90 should be configured so as to permit the thermostat 20 to expand beyond typical operating range. In other words, the spring 74 should completely bottom out without having the lower section 84 contact the sidewall of the tapered counterbore 90.

In addition, it will be noted that the rod 88, in this instance, serves as a controlling flow orifice when the thermostat 20 is in the closed position of FIG. 3. This orifice needs to be sized small enough to encourage good heater flow when the thermostat 20 is in the closed position. It has been found that when the orifice is larger than that created by the interface of the rod 88 and the by-pass passage 48, the heater flow is less than optimum. Although the rod 88 provides the above-described function, it could be eliminated and still realized the advantages of the present invention, namely, the use of pellet 54 to effectively see the correct temperature of the coolant and thus operate effectively. For example, the size of the by-pass passage 48 can be reduced in size so as to create the same effective flow restriction as the combination of the rod 88 and the by-pass passage 48.

Various changes and modifications can be made in the flow control assembly described above without departing from the spirit of the invention. Such changes and modifications are contemplated by the inventors and they do not wish to be limited except by the scope of the appended claims.,

What is claimed is:

1. A cooling system for an internal combustion engine comprising:
    a coolant flow control housing, said housing having a heater core inlet passage, a heater core bypass passage, an intake passage, and an outlet passage formed therein; and a thermostat located in said housing for controlling flow of liquid coolant, said thermostat having a valve member adapted to close said intake passage when said liquid coolant is below a predetermined temperature, a lower section of said thermostat having a cylindrical configuration and being provided with a heat sensitive member for causing said valve member to move to an open position when the temperature of said liquid coolant is above said predetermined temperature, and said housing having a counterbore tapered along its longitudinal axis and forming a part of said bypass passage for receiving and enclosing said lower section of said thermostat within said counterbore when said valve member is in said open position for effectively controlling the flow of said liquid coolant through said bypass passage, wherein said lower section is positioned in said counterbore when said thermostat is said open position so as to allow some coolant flow through said counterbore so as to prevent foreign matter from lodging between said lower section and the inner tapered wall of said counterbore.

2. The cooling system of claim 1 wherein said lower section has a rod depending therefrom that is aligned along the longitudinal center axis of said lower section so as to allow said rod to extend into said counterbore when said thermostat is in the closed position for controlling the coolant flow through the bypass passage.

3. A cooling system for an internal combustion engine comprising:

a coolant flow control housing, said housing having a heater core inlet passage, a heater core bypass passage, an intake passage for receiving liquid coolant, and an outlet passage formed therein and a thermostat located in said housing for controlling flow of liquid coolant, said thermostat having a valve member adapted to close said intake passage when said liquid coolant is below a predetermined temperature, a heat responsive expandable and contractible medium operatively mounted in a lower section of said thermostat for causing said valve member to move to an open position when the temperature of said liquid coolant is above said predetermined temperature to allow liquid coolant to flow from said internal combustion engine, said lower section having a cylindrical body that has a first diameter, and said housing having a tapered counterbore within said bypass passage that has a diameter greater than said first diameter of said lower section at its upper end and a diameter less than said first diameter at its lower end for receiving and enclosing said lower section within said tapered counterbore when said thermostat is in said open position for effectively controlling the flow of said liquid coolant through said bypass passage, wherein said lower section is positioned in said counterbore when said thermostat is in said open position so as to allow some coolant flow through said counterbore so as to prevent foreign matter from lodging between said lower section and the inner tapered wall of said counterbore.

4. The cooling system of claim 3 wherein said lower section has a rod depending from said lower section so as to allow said rod to extend into said counterbore when said thermostat is in the closed position for controlling the coolant flow through the bypass passage.

5. The cooling system of claim 4 wherein said rod is aligned along the longitudinal center axis of said lower section.

\* \* \* \* \*